Patented July 25, 1933

1,920,009

UNITED STATES PATENT OFFICE

MAX ENGELMANN, OF WILMINGTON, DELAWARE, ASSIGNOR TO BAYER-SEMESAN COMPANY, OF WILMINGTON, DELAWARE, A CORPORATION OF DELAWARE

SEED DISINFECTANT

No Drawing.    Application filed July 25, 1929. Serial No. 381,082.

This invention relates to a new series of bactericidal agents for disinfecting purposes, and more particularly to organic lead compounds and the process of controlling seed and plant diseases by such compounds.

In my copending application, Serial No. 257,544, filed February 27, 1928, I have disclosed a method of making dust disinfectants by interaction of certain organic lead compounds and mercury salts by a one step process.

An object of this invention is a new series of disinfecting compositions comprising organic lead compounds and their derivatives. A further object of this invention is the control of seed and plant diseases by means of lead compounds in which the lead is attached to a carbon atom.

I have now found that organic lead compounds in which the lead is attached to a carbon atom are very effective as disinfecting agents, and are particularly effective as seed disinfectants and fungicides.

Furthermore, I have found that these materials may be applied in the form of a solution, or in colloidal or non-colloidal suspension, or as a dry powder in more or less concentrated form, depending upon the effectiveness desired or the type of disease to be controlled.

Suitable compounds which I have found have desirable disinfecting properties for the purpose described are tri-ethyl lead, tri-ethyl lead chloride, diphenyl lead dibromide, tetra phenyl lead, lead di-methyl-di-chloride, di-ethyl lead sulfate, di-cyclohexyl lead chloride and lead diphenyl oxide.

It will be understood, however, that the foregoing compounds are given for illustrative purposes merely and that I do not intend to be limited thereby as other organic lead derivatives may be substituted therefore within the scope of my invention.

I have also found that the efficiency of these derivatives does not depend on their water solubility. Those products which are substantially insoluble in water may be used satisfactorily, for example, either in suspension or as dry powders.

In order to further illustrate my invention the following specific embodiments are given:

Example I

An aqueous solution of one part of tri-phenyl lead chloride in 500 parts of water will kill staphyloccus aureus in less than ten minutes. One part of the same material diluted in 100,000 parts of water inhibits the growth of spores of *Tilletia tritici* which causes the bunt disease of wheat.

Example II

Fifteen parts of tri-phenyl lead chloride are intimately mixed with 85 parts of finely divided clay. This mixture put on seeds at the rate of three ounces to a bushel will control, for instance, Diplodia infection of field corn, the stripe disease of barley, the smuts of oats, and the like. It can also be incorporated in the soil for controlling harmful soil fungi.

Example III

Five parts of tri-ethyl lead chloride diluted with 95 parts of hydrated lime are intimately mixed in a ball mill. The product is then ready for use as a disinfectant.

It will be apparent, however, from the foregoing that the proportions of the active ingredient and the inert diluent may be varied within wide limits without departing from the spirit of my invention.

This new series of disinfecting compounds may also be used in combination with other disinfectants, such, for example, as copper salts, organic or inorganic mercury salts; likewise with organic mercury compounds in which the metal is attached to the carbon, such, for example, as ethyl mercury chloride or mercurized phenols, etc., organic arsenicals, and the like. Furthermore, this new series of disinfecting compounds may be employed also in combination with insecticides, such, for example, as calcium arsenicals, nicotine preparations, pyrethrum powder, etc.

As many apparently widely different embodiments of this invention may be made without departing from the spirit thereof, it is to be understood that I do not intend to limit myself to the foregoing examples or description, except as indicated in the following patent claims.

I claim:

1. A seed disinfecting composition the active ingredient of which consists essentially of an organic lead compound in which the lead is attached to a carbon atom.

2. A seed disinfectant composition the active constituent of which is a lead compound, taken from a group consisting of tri-ethyl lead, tri-ethyl lead chloride, diphenyl lead dibromide, tetra-phenyl lead, lead di-methyl di-chloride, di-ethyl lead sulfate, di-cyclohexyl lead chloride and lead diphenyl oxide.

3. A seed disinfectant composition the active constituent of which is tri-phenyl lead chloride.

MAX ENGELMANN.